April 1, 1941.                O. A. PERRY                2,236,880
                          VOLTAGE REGULATOR
                          Filed Dec. 7, 1936
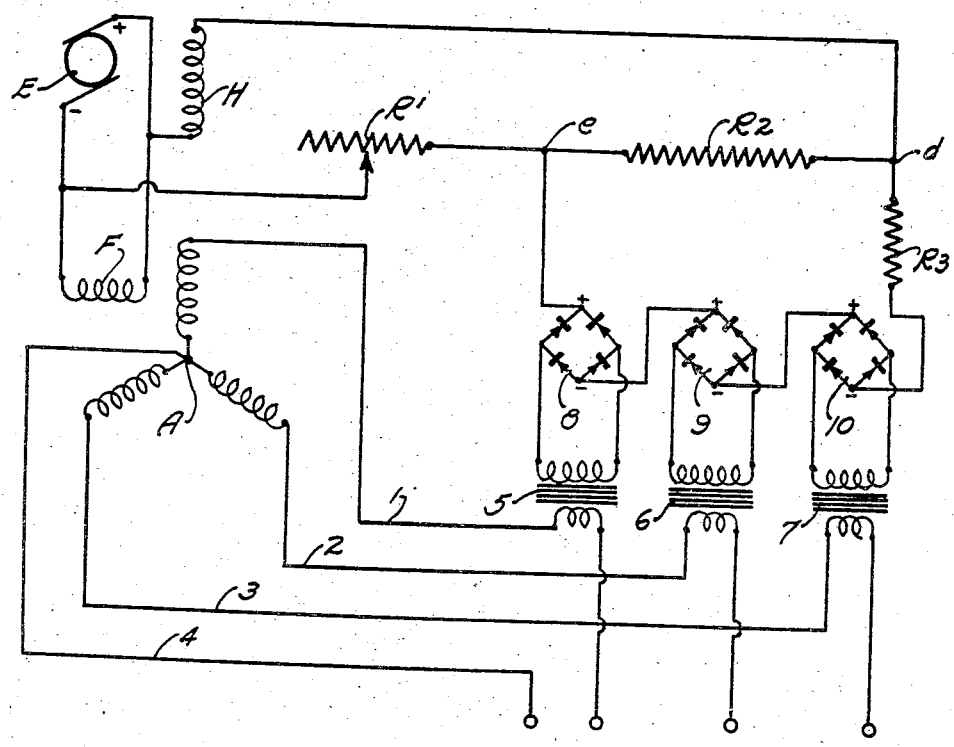
INVENTOR.
Oliver A. Perry,
BY
Robert N. Fulwider
ATTORNEY.

Patented Apr. 1, 1941

2,236,880

UNITED STATES PATENT OFFICE 2,236,880

VOLTAGE REGULATOR

Oliver A. Perry, Los Angeles, Calif.

Application December 7, 1936, Serial No. 114,553

2 Claims. (Cl. 171—119)

My invention relates broadly to polyphase alternators and has for its major object the provision of an improved type of apparatus for regulating or compensating for voltage variations in the output of alternators due to load changes or other causes.

More particularly it is the object of my invention to provide an automatic voltage regulator which gives close and accurate regulation, substantially instantaneous response to load changes, has no moving parts, and which on a polyphase alternator gives regulation proportional to total load current regardless of the degree of unbalance in the phases.

One of the advantages of my system of automatic voltage regulation is that the load of an alternator may be varied suddenly and rapidly from no load to full load or vice-versa, with no noticeable change in voltage except that caused by change in speed of the rotor before the power plant governor restores the speed to normal. If there is a permanent speed droop due to increased load, the voltage loss due to this droop can be corrected for by adjusting the compensator resistor to give a greater degree of compensation than would otherwise be necessary.

Another feature of my invention is that it allows the voltage of the alternator to build up with increase in load to compensate for increasing line drop on long lines.

These and other objects and advantages of my invention will become apparent from the following description of a preferred form thereof and from the accompanying drawing which shows a wiring diagram illustrating my invention used with a three phase synchronous alternator, it being understood of course that my invention is equally applicable to any polyphase alternator.

In the drawing the letter A indicates a three-phase alternator of conventional type having a field F, it being understood that the alternator may be of the rotating armature or rotating field type as desired. Suitable means for exciting the field is provided and may be in the nature of a separate exciter E, whose field is designated by the letter H. A variable resistance or resistor R1 and a fixed resistance R2 are provided in the field circuit of the exciter E. Three load lines indicated by the numerals 1, 2 and 3 respectively and a neutral line 4 lead from the alternator A in the usual manner.

Load lines 1, 2 and 3 are provided with current transformers 5, 6 and 7 respectively whose secondaries are connected to rectifiers 8, 9 and 10 respectively. The rectifiers are preferably of the full wave dry oxide type oversize for the requirements to insure longer life. The rectifiers are connected in series with their positive terminal connected to the exciter field circuit at C and their negative terminal connected through a resistance R3 to the exciter field circuit at d.

The resistor R1 allows manual adjustment of the exciter field to secure the proper voltage at no load condition. The resistance R2 serves to cut the exciter field current down to that required for no load excitation and secondly it serves to match the resistance of the rectifier circuit to the requirements of the exciter field circuit, since the rectifier resistance is usually much too high to include directly in the exciter field circuit. The resistance R3 is for the purpose of limiting the degree of compensation to that required for a given installation.

The transformers 5, 6 and 7 are designed to give outputs sufficient to allow full or over compensation over the entire load range. The secondary voltages of these transformers are proportional to the load currents in the primaries, and while the primary voltages will not add up arithmetically as A. C. voltages, the rectified outputs of the secondaries do add arithmetically, and by doing so, give compensation proportional to the total polyphase current, without regard to any unbalance of the phases. If all governors gave speed regulation without droop, and if all load lines were short, the transformers could be designed to give just the proper amount of compensation to maintain constant voltage output, but as such is never the case, the transformers must be over capacity and then cut down for each specific condition encountered, by means of a regulating resistance in the rectifier circuit.

In operation R1 is adjusted so that at no load condition just enough current flows in the exciter field circuit to give full voltage across the alternator terminals. Some of the exciter field current will of course flow through the rectifier circuit, although due to the relatively high resistance of the rectifiers this amount is quite small, probably around 10% of the total field current. When the alternator starts delivering current to the load the rectifier group acts as a voltage generator in series with the exciter field, and as the load on the alternator increases, builds up the voltage applied to the exciter field, and thus compensates for the inherent load voltage droop of the alternator.

By placing a transformer and rectifier in each of the load lines 1, 2 and 3, instant and proportional voltage compensation is provided for any load change in any or all of the phases, so that my regulator functions equally well on unbalanced loads.

While I have illustrated a preferred form of my invention as applied to a three phase alternator and preferably using a dry oxide type rectifier, it will be understood that this is merely illustrative of one form of my invention and that it comprehends various types of alternators, rectifiers and transformers and that the necessary adjustments required to be made for different installations will be apparent to those skilled in the art.

I claim as my invention:

1. An instantaneously starting and controlling voltage-regulator system for polyphase alternators having a separate exciter, which includes: a current transformer in each phase lead of said alternator; a full-wave "dry" type rectifier connected across the secondary of each of said transformers, the output of said rectifiers being connected in series; a resistance connected in series with said rectifier circuit; a second resistance connected in shunt across said rectifier-resistance circuit and connected in series with the field of said exciter, the output of said rectifier-resistance circuit being connected so as to boost the voltage normally supplied to said field; and a third resistance connected in series with said field, whereby said field excitation of said exciter may be manually controlled to control said alternator output voltage by controlling the field excitation of said alternator.

2. An instantaneously starting and controlling voltage-regulator system for separately excited polyphase alternators which includes: a current transformer in each phase lead of said alternator; a full-wave "dry" type rectifier connected across the secondary of each of said transformers, said rectifiers being connected in series with each other and in series with the field excitation circuit of said exciter to increase said field excitation; a resistance connected in series with said rectifiers; a second resistance connected in parallel with said rectifier-resistance circuit; and a third resistance connected in series with said field excitation circuit to control the no-load voltage of said alternator.

OLIVER A. PERRY.